(12) United States Patent
Aronovich (10) Patent No.: US 10,073,853 B2
(45) Date of Patent: Sep. 11, 2018

(54) ADAPTIVE SIMILARITY SEARCH RESOLUTION IN A DATA DEDUPLICATION SYSTEM

(71) Applicant: INTERNATIONAL BUSINESS MACHINES CORPORATION, Armonk, NY (US)

(72) Inventor: Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1111 days.

(21) Appl. No.: 13/941,800

(22) Filed: Jul. 17, 2013

(65) Prior Publication Data

US 2015/0026135 A1    Jan. 22, 2015

(51) Int. Cl.
*G06F 17/30* (2006.01)

(52) U.S. Cl.
CPC .. *G06F 17/30097* (2013.01); *G06F 17/30109* (2013.01); *G06F 17/30159* (2013.01)

(58) Field of Classification Search
CPC ......... G06F 17/30097; G06F 17/30109; G06F 17/30159; G06F 17/30303; G06F 17/30371; G06F 17/30584; G06F 17/30598; G06F 17/30876; G06F 3/0641
See application file for complete search history.

(56) References Cited

U.S. PATENT DOCUMENTS

| | | | |
|---|---|---|---|
| 5,990,810 A | 11/1999 | Williams | |
| 6,810,398 B2 | 10/2004 | Moulton | |
| 7,523,098 B2 | 4/2009 | Hirsch et al. | |
| 7,694,191 B1 | 4/2010 | Bono et al. | |
| 8,108,353 B2 | 1/2012 | Balachandran et al. | |
| 8,200,923 B1 | 6/2012 | Healy et al. | |
| 8,285,957 B1 | 10/2012 | Nag et al. | |
| 8,412,848 B2 | 4/2013 | Therrien et al. | |
| 8,918,390 B1* | 12/2014 | Shilane | G06F 17/30162 707/693 |
| 2006/0059173 A1* | 3/2006 | Hirsch | G06F 11/1453 |
| 2006/0059207 A1* | 3/2006 | Hirsch | G06F 11/1453 |

(Continued)

FOREIGN PATENT DOCUMENTS

| | | |
|---|---|---|
| WO | 2012092348 A2 | 7/2012 |
| WO | 2012158654 A2 | 11/2012 |

OTHER PUBLICATIONS

Anonymous; "Framework for Stream De-duplication using Biased Reservoir-Sampling"; http://priorartdatabase.com/IPCOM/000216344; Mar. 31, 2012.

(Continued)

*Primary Examiner* — Mark D Featherstone
*Assistant Examiner* — Navneet Gmahl
(74) *Attorney, Agent, or Firm* — Griffiths & Seaton PLLC (57) ABSTRACT

For adaptive similarity search resolution in a data deduplication system using a processor device in a computing environment, input data is partitioned into data chunks. Input similarity elements are calculated for an input chunk. The input similarity elements are used to find similar data in a repository of data using a similarity search structure. A resolution level is calculated for storing the input similarity elements. The input similarity elements are stored in the calculated resolution level in the similarity search structure.

18 Claims, 7 Drawing Sheets

(56) References Cited

U.S. PATENT DOCUMENTS

| | | |
|---|---|---|
| 2008/0013830 A1 | 1/2008 | Patterson et al. |
| 2008/0313128 A1* | 12/2008 | Arasu ............... G06F 17/30312 |
| 2009/0307251 A1 | 12/2009 | Heller et al. |
| 2010/0088277 A1 | 4/2010 | Rao et al. |
| 2010/0088349 A1 | 4/2010 | Parab |
| 2010/0198797 A1 | 8/2010 | Wideman |
| 2011/0016095 A1 | 1/2011 | Anglin et al. |
| 2011/0029497 A1 | 2/2011 | Benhase et al. |
| 2011/0099351 A1* | 4/2011 | Condict ................ G06F 3/0608 |
| | | 711/216 |
| 2011/0238635 A1 | 9/2011 | Leppard |
| 2011/0296133 A1* | 12/2011 | Flynn ................ G06F 11/1048 |
| | | 711/171 |
| 2012/0023070 A1 | 1/2012 | Prahlad et al. |
| 2012/0023112 A1 | 1/2012 | Levow et al. |
| 2012/0089781 A1* | 4/2012 | Ranade ............. G06F 17/30203 |
| | | 711/118 |
| 2012/0131025 A1* | 5/2012 | Cheung ............. G06F 17/30159 |
| | | 707/755 |
| 2012/0150823 A1* | 6/2012 | Tofano .............. G06F 17/30336 |
| | | 707/692 |
| 2012/0159098 A1* | 6/2012 | Cheung ............... G06F 12/0261 |
| | | 711/162 |
| 2012/0166401 A1* | 6/2012 | Li ....................... G06F 17/3033 |
| | | 707/692 |
| 2012/0166448 A1* | 6/2012 | Li ..................... G06F 17/30097 |
| | | 707/747 |
| 2012/0226697 A1 | 9/2012 | Chang et al. |
| 2012/0239625 A1 | 9/2012 | Arnovich et al. |
| 2012/0259825 A1 | 10/2012 | Tashiro et al. |
| 2012/0323859 A1 | 12/2012 | Yasa et al. |
| 2012/0323860 A1 | 12/2012 | Yasa et al. |
| 2013/0018854 A1 | 1/2013 | Condict |
| 2013/0054544 A1 | 2/2013 | Li et al. |
| 2013/0073529 A1* | 3/2013 | Aronovich ................ G06F 7/00 |
| | | 707/692 |
| 2013/0212074 A1* | 8/2013 | Romanski ........... G06F 12/0253 |
| | | 707/692 |
| 2014/0188822 A1* | 7/2014 | Das ..................... H03M 7/3091 |
| | | 707/693 |
| 2015/0033120 A1* | 1/2015 | Cooke ................ G06F 17/2217 |
| | | 715/271 |

OTHER PUBLICATIONS

Bhagwat, D. et al.; "Extreme Binning: Scalable, Parallel Deduplication for Chunk-based File Backup"; Proceedings of the 17th IEEE/ACM International Symposium on Modeling, Analysis and Simulation of Computer and Telecommunication Systems (MASCOTS'2009), London, UK, Sep. 2009.

Zhu, B., Li, K., and Patterson, H., "Avoiding the disk bottleneck in the Data Domain deduplication file system", In Proceedings of the 6th USENIX Conference on File and Storage Technologies (FAST) (San Jose, CA, USA, Feb. 2008), USENIX Association, pp. 269-282.

M. Lillibridge, K. Eshghi, D. Bhagwat, V. Deolalikar, G. Trezise, and P. Campbell, "Sparse Indexing: Large scale, inline deduplication using sampling and locality", In Proceedings of the Eighth USENIX Conference on File and Storage Technologies (FAST), Feb. 2009, pp. 111-123.

Bartłomiej Romański, Łukasz Heldt, Wojciech Kilian, Krzysztof Lichota, and Cezary Dubnicki, "Anchor-driven subchunk deduplication", In Proceedings of the 4th Annual International Conference on Systems and Storage (SYSTOR '11). ACM, New York, NY, USA, Article 16 , 13 pages.

Muthitacharoen, A., Chen, B., and Mazi'Eres, D. "A low-bandwidth network file system". In Proceedings of the 18th ACM Symposium on Operating Systems Principles (SOSP) (Banff, Alberta, Canada, Oct. 2001), ACM Press, pp. 174-187.

Cai Bo, Zhang Feng Li, Wang Can. "Research on Chunking Algorithms of Data De-Duplication". American Journal of Engineering and Technology Research vol. 11, No. 9, 2011.

* cited by examiner

ADAPTIVE SIMILARITY SEARCH RESOLUTION IN A DATA DEDUPLICATION SYSTEM

CROSS REFERENCE TO RELATED APPLICATIONS

The present application is cross-related to the following seventeen applications each listed as: U.S. application Ser. No. 13/941,703, U.S. application Ser. No. 13/941,873, U.S. application Ser. No. 13/941,694, U.S. application Ser. No. 13/941,886, U.S. application Ser. No. 13/941,896, U.S. application Ser. No. 13/941,951, U.S. application Ser. No. 13/941,711, U.S. application Ser. No. 13/941,958, U.S. application Ser. No. 13/941,714, U.S. application Ser. No. 13/941,742, U.S. application Ser. No. 13/941,769, U.S. application Ser. No. 13/941,782, U.S. application Ser. No. 13/941,982, U.S. application Ser. No. 13/941,999, U.S. application Ser. No. 13/942,009, U.S. application Ser. No. 13/942,027, and U.S. application Ser. No. 13/942,048, all of which are filed on the same day as the present invention and the entire contents of which are incorporated herein by reference and are relied upon for claiming the benefit of priority.

BACKGROUND OF THE INVENTION

Field of the Invention

The present invention relates in general to computers, and more particularly to adaptive similarity search resolution in a data deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for adaptive similarity search resolution in a data deduplication system using a processor device in a computing environment. In one embodiment, by way of example only, input data is partitioned into data chunks. Input similarity elements (e.g., high resolution input similarity elements) are calculated for an input chunk. The high resolution input similarity elements are used to find similar data in a repository of data using a similarity search structure. A resolution level is calculated for storing the input similarity elements. The input similarity elements are stored in the calculated resolution level in the similarity search structure.

In another embodiment, a computer system is provided for adaptive similarity search resolution in a data deduplication system using a processor device, in a computing environment. The computer system includes a computer-readable medium and a processor in operable communication with the computer-readable medium. In one embodiment, by way of example only, the processor, partitions input data into data chunks. Input similarity elements (e.g., high resolution input similarity elements) are calculated for an input chunk. The high resolution input similarity elements are used to find similar data in a repository of data using a similarity search structure. A resolution level is calculated for storing the input similarity elements. The input similarity elements are stored in the calculated resolution level in the similarity search structure.

In a further embodiment, a computer program product is provided for adaptive similarity search resolution in a data deduplication system using a processor device, in a computing environment. The computer-readable storage medium has computer-readable program code portions stored thereon. The computer-readable program code portions include a first executable portion that, partitions input data into data chunks Input similarity elements (e.g., high resolution input similarity elements) are calculated for an input chunk. The high resolution input similarity elements are used to find similar data in a repository of data using a similarity search structure. A resolution level is calculated for storing the input similarity elements. The input similarity elements are stored in the calculated resolution level in the similarity search structure.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Data deduplication is a highly important and vibrant field in computing storage systems. Data deduplication refers to the reduction and/or elimination of redundant data. In data deduplication, a data object, which may be a file, a data stream, or some other form of data, is partitioned into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.). In one embodiment, a deduplication storage system may be based on maintaining a search optimized index of values known as fingerprints or digests, where a small fingerprint represents a larger block of data in the repository. The fingerprint values may be cryptographic hash values calculated based on the blocks' data. In one embodiment, secure hash algorithm (SHA), e.g. SHA-1 or SHA-256, which are a family of cryptographic hash functions, may be used. Identifying fingerprint matches, using index lookup, enables to store references to data that already exists in a repository. In one embodiment, block boundaries may be determined based on the data itself.

To provide reasonable deduplication in this approach, the mean size of the data blocks based on which fingerprints are generated must be limited to smaller sizes and may not be too large. The reason being that a change of a bit within a data block will probabilistically change the data block's corresponding fingerprint, and thus having large data blocks makes the scheme more sensitive to updates in the data as compared to having small blocks. A typical data block size may range from 4 KB to 64 KB, depending on the type of application and workload. Thus, by way of example only, small data blocks may range in sizes of up to 64 KB, and large data blocks are those data blocks having a size larger than 64 KB.

To support very large repositories scaling to Petabytes (e.g., repositories scaling to at least one Petabyte=$2^{50}$ bytes), the number of fingerprints to store coupled with the size of a fingerprint (ranging between 16 bytes and 64 bytes), becomes prohibitive. For example, for 1 Petabyte of deduplicated data, 4 Kilobytes mean data block size, and 32 bytes fingerprint size (e.g. of SHA-256), the storage required to store the fingerprints is 8 Terabytes. Maintaining a search optimized data structure for such volumes of fingerprints is difficult, and existing optimization techniques do not scale to these sizes while maintaining performance. For this reason, to provide reasonable performance, the supported repositories have to be relatively small (on the order of tens of Terabytes). Even for such smaller sizes, considerable challenges and run-time costs arise due to the large scale of the fingerprint indexes that create a bottle-neck in deduplication processing.

In one embodiment, by way of example only, the term "similar data" may be referred to as: for any given input data, data which is similar to the input data is defined as data which is mostly the same (i.e. not entirely but at least 50% similar) as the input data. From looking at the data in a binary perspective, this means that similar data is data where most (i.e. not entirely but at least 50% similar) of the bytes are the same as the input data.

In one embodiment, by way of example only, the term "similarity search" may be referred to as the process of searching for data which is similar to input data in a repository of data. In one embodiment, this process may be performed using a search structure of similarity elements, which is maintained and searched within.

In one embodiment, by way of example only, the term "similarity elements" represents elements which may be calculated based on the data and facilitate a global search for data which is similar to input data in a repository of data. In general, one or more similarity elements are calculated, and represent a large (e.g. at least 4 MB) chunk of data.

Thus, as described above, the deduplication approach of the present invention uses a two-step process for finding data matches during deduplication. In the first step, a large chunk of input data (e.g. 4 MB) is searched in the repository for similar (rather than identical) chunks of existing data, and the input chunk is partitioned accordingly into intervals, and paired with corresponding similar repository intervals. The similarity search structure (or "index") used in the first step is compact and simple to maintain and search within, because the elements used for a similarity search are very compact relative to the data they represent (e.g. 16 bytes representing 4 megabytes). In the second step, matches of identical data are found in the similar input and repository intervals. This can be done by comparing the data of these intervals or by comparing digests of the data. This approach is termed as the similarity based deduplication approach.

At the basis of the similarity based deduplication approach there is a fundamental trade-off involving the size of the data chunks represented by each of the similarity elements used in similarity search. If the chunks are large, then the similarity index is smaller, thus requiring less computational resources (i.e. less IO, storage, RAM, networking, and mutual exclusion) for working with the index (i.e. search and update operations). However, with large chunks, the reliability of the results of similarity search becomes more sensitive to the internal reordering rate and the change rate of a workload. Namely, similarity search becomes less effective as the reordering rate or change rate increase.

In one embodiment, in deduplication systems that maintain a large chunk size for similarity search (e.g. 8 MB or more), to keep resource consumption sustainable, this can cause low effectiveness or even inability to effectively deduplicate workloads with inherent reordering or high change rates. There are many examples of such workloads, e.g. multiplexed backups (multiplexing is used to increase backup performance and comply with backup window times), virtual machine workloads, and workloads of databases or other applications using compaction or defragmentation. In deduplication systems as those mentioned above, such workloads can reduce or eliminate the ability of the similarity search process to find similar data, and therefore can considerably reduce the overall deduplication effectiveness of the deduplication system. These types of workloads are very typical in user environments, and therefore this limitation can reduce the competitiveness of a deduplication system.

In a multiplexed workload a data set is read by concurrent backup processes and streamed into a storage system. This concurrency enhances backup performance, and is very common in backup environments. However, this concurrency causes internal reordering of sections of the data, between generations of data that should deduplicate with each other. Such reordering is very probable to cause the similarity elements calculated for a given generation of a data set to be different than those calculated for previous generations of the data set, thus reducing or eliminating the ability to find similar data.

For multiplexed workloads, fitting the chunk size used for similarity search to accord with the granularity of reordering will improve deduplication. For example, if sections of 1 MB are reordered across generations of a data set, then to maximize the deduplication potential, for each 1 MB of input data a similar repository interval should be found. If, for instance, the chunk size used is 8 MB (namely, one similarity element for each chunk of 8 MB), then a similar 8 MB interval is found for each 8 MB of input data, therefore likely losing 7 MB of potential deduplication for each input chunk. If the chunk size used is smaller, e.g. 1 MB, hence finding a similar 1 MB interval for each 1 MB of input data, then the deduplication potential is maximized in this example. However, reducing the chunk size entails additional resource consumption costs.

Workloads with high change rates and/or internal reordering are typical for data sets that undergo frequent updates, or undergo compaction or defragmentation. In such workloads a given generation of a data set is considerably different than a previous generation of the same data set. This is very likely to cause the similarity elements calculated for a given generation to be different than those calculated for the previous generations, thus reducing or eliminating the ability to find similar data.

In one embodiment, when there is higher probability of change in the similarity elements, due to high change rates and/or internal reordering, having a smaller chunk size enables having more similarity elements for a given size of data, which increases the probability that some of the similarity elements will remain the same between generations. For example, by having one similarity element for an 8 MB chunk, the fate of the entire 8 MB of data depends on the stability of that single similarity element between generations. By lowering the chunk size, the fate of less data depends on the stability of each of the similarity elements, and therefore the similarity search process becomes less sensitive to the effects of the change rate and the internal reordering rate. However, as said, reducing the chunk size entails additional resource consumption costs.

Thus, a smaller chunk size for similarity search has a considerable improving effect on deduplication, but also considerably increases the resource consumption of the operations on the similarity index. This is denoted as the similarity resolution trade-off Therefore a need exists for a solution that will enable using smaller chunk sizes in similarity search, to improve deduplication effectiveness and enable deduplication of the above workload types, while keeping resource consumption low. Thus, in one embodiment, the present invention provides a solution of adaptive similarity search resolution in a similarity based data deduplication system using a processor device in a computing environment. The adaptive similarity search resolution enables automatic selection of an optimal similarity search chunk size for each workload, thus enabling usage of smaller chunk sizes where required, to improve deduplication and enable effective deduplication of the workloads specified above, while keeping resource consumption low. In one embodiment, the present invention partitions the input data into chunks, and high resolution input similarity elements are calculated for each input chunk. The high resolution input similarity elements are used to find similar data in a repository of data using a similarity search structure. A resolution level is calculated for storing the input similarity elements. The input similarity elements are stored in the calculated resolution level in the similarity search structure.

In one embodiment, the present invention provides a similarity based deduplication process where a stream of input data is partitioned into chunks (e.g. 8 MB), and each chunk is processed in two main steps. In the first step a similarity search process is applied, and positions of the most similar reference data in the repository are found. Then, in the second step, the input chunk is matched with the similar repository data, to form data matches, by either comparing digests of the data, or comparing the data itself.

A main idea underlying the present invention, as described herein, is that different types of workloads may be processed with different resolutions of similarity search to produce optimal deduplication. Namely, workloads with low reordering and change rates can be processed with low resolution similarity and produce optimal deduplication, while workloads with high reordering or change rates should be processed with high resolution similarity to produce optimal deduplication. Further, several levels of resolutions can be defined to accommodate different types of workloads. For example, a low resolution can be defined to be a single similarity element for a chunk size of 8 MB, and a high resolution can be defined to be a single similarity element for a chunk size of 1 MB. In between, the following resolutions can be defined: a single similarity element for a chunk size of 2 MB, and for a chunk size of 4 MB. Thus forming 4 levels of resolution of similarity search, accommodating workloads with varying reordering and change rates. As a workload is characterized by higher reordering or change rates, a higher similarity resolution should be used to process it.

An additional main idea underlying the present invention is that with the calculation method of similarity elements used in this invention, the different resolutions are compatible with each other. Namely, similarity elements of a specific resolution may be used to find similar data for which a different resolution of similarity elements was produced and stored. The reason for this compatibility is that for each specific resolution, its similarity elements are a subset of the similarity elements of resolutions, which are higher than that specific resolution. Consider the following example: Four resolutions are defined—a single similarity element for chunk sizes of 1 MB, 2 MB, 4 MB and 8 MB. The similarity elements of the 2 MB resolution are a subset of the similarity elements of the 1 MB resolution. The similarity elements of the 4 MB resolution are a subset of the similarity elements of the 2 MB resolution, and so forth. This property is denoted herewith as the similarity elements inclusion property. The reason for this property derives from the method of calculation of similarity elements. According to the calculation method of similarity elements, the similarity elements are selected by calculating either the maximal value, or the minimal value, or any repeatable selection criterion, from the rolling hash values calculated for a chunk of data. Consider for example selection of the maximal value. The maximal value of the rolling hash values of a 2 MB chunk, is one of the two maximal values of the rolling hash values calculated for the two 1 MB chunks constituting the 2 MB chunk. Therefore, the similarity element calculated for the 2 MB chunk is one of the two similarity elements calculated for the two 1 MB chunks constituting the 2 MB chunk. Hence the inclusion property of the similarity elements.

Consider an input chunk of data, and a similar chunk of data already stored in the repository within a previous generation of the data set. Consider a first case where the similarity elements calculated for the input chunk are of higher resolution than those of the repository chunk. Since, according to the inclusion property, the similarity elements of the repository chunk are a subset of the similarity elements of the input chunk then some of the similarity elements of the input chunk will be matched with the similarity elements of the repository chunk. This will enable to consider the repository chunk in the similarity search processing, and output the repository chunk as a similar repository interval. Consider a second case where the similarity elements calculated for the input chunk are of lower resolution than those of the repository chunk. Since, according to the inclusion property, the similarity elements of the input chunk are a subset of the similarity elements of the repository chunk then the similarity elements of the input chunk will be matched with the similarity elements of the repository chunk. This will enable to consider the repository chunk in the similarity search processing, and output the repository chunk as a similar repository interval. Hence the compatibility property of the various resolutions of similarity search.

In one embodiment, the present invention provides an algorithm for determining the appropriate similarity resolution for a given workload. The algorithm of the present invention enables to use a higher similarity resolution for workloads with high reordering and/or high change rates, and a lower similarity resolution for workloads with low reordering and change rates. This is achieved by the algorithm learning the properties of the workloads using calculated statistics, distinguishing between workloads that require higher similarity resolution and workloads, which require lower similarity resolution, and applying appropriate similarity resolution for each workload.

In one embodiment, the present invention solves a considerable limitation of similarity based deduplication systems, which commonly can not produce good deduplication for workloads which are difficult for deduplication, e.g. workloads with high reordering rate or high change rate. In one embodiment, the present invention enables similarity based deduplication systems to effectively deduplicate difficult workloads, and improve the overall deduplication results, while keeping resource consumption low. Examples of such workloads are multiplexed backups, virtual machine data sets, and databases backups. Since such workloads are typical in customer environments, this solution resolves a considerable limitation of similarity based deduplication systems and significantly improves their competitiveness.

Figure 1:
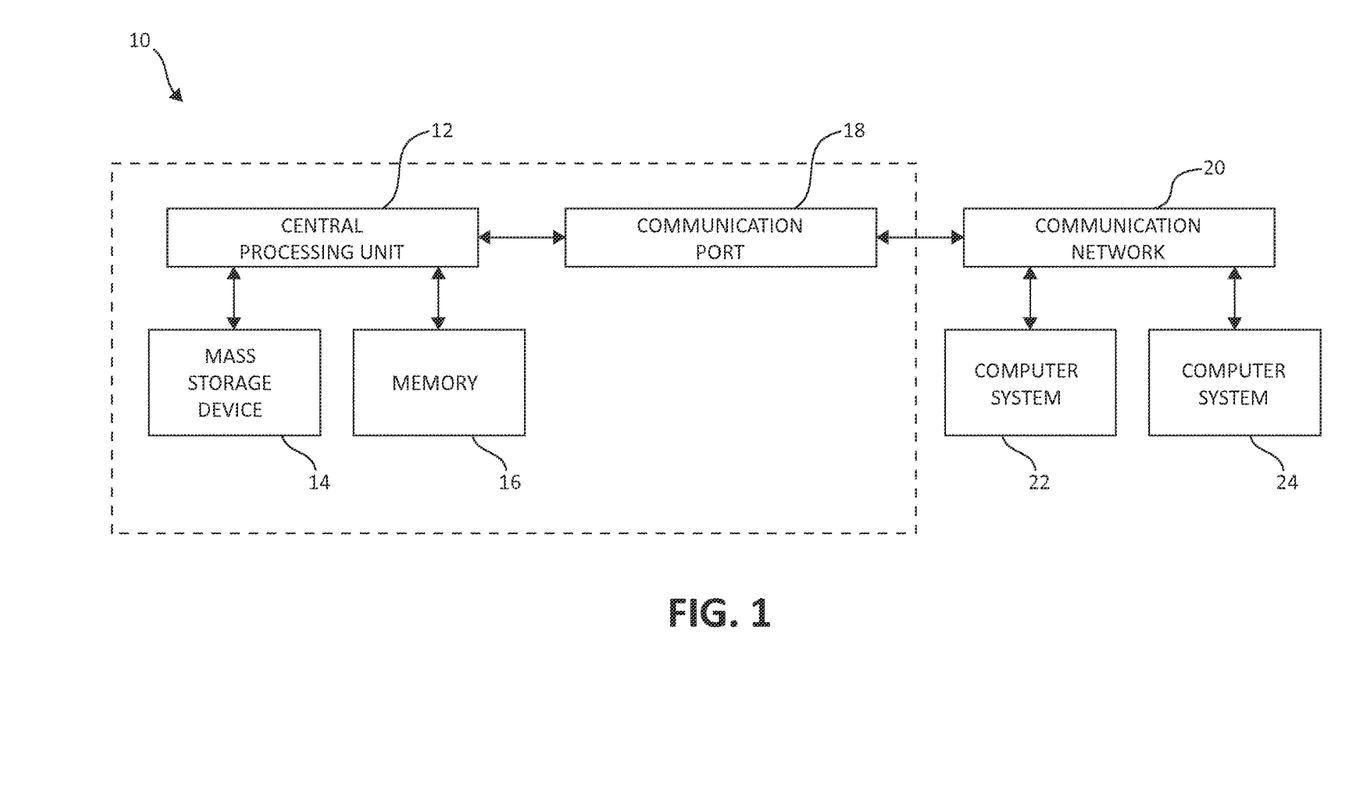
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
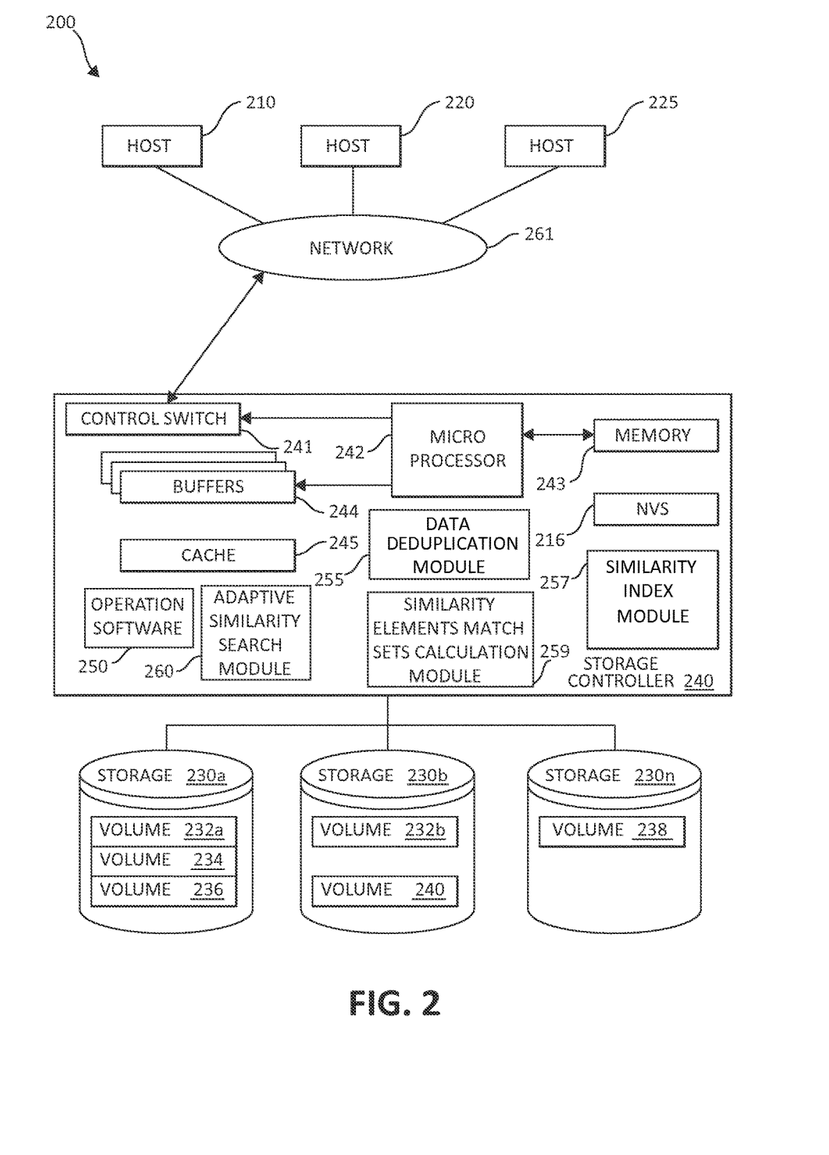
FIG. 2 is a block diagram illustrating a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 261 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 261 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 261 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, a similarity index module 257, a similarity elements match sets calculation module 259, and an adaptive similarity search module 260. The data duplication module 255, the similarity index module 257, the similarity elements match sets calculation module 259, and the adaptive similarity search module 260 may work in conjunction with each and every component of the storage controller 240, the hosts 210, 220, 225, and storage devices 230. The data duplication module 255, the similarity index module 257, the similarity elements match sets calculation module 259, and the adaptive similarity search module 260 may be structurally one complete module or may be associated and/or included with other individual modules. The data duplication module 255, the similarity index module 257, the similarity elements match sets calculation module 259, and the adaptive similarity search module 260 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the similarity index module 257, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255, the similarity index module 257, the similarity elements match sets calculation module 259, and the adaptive similarity search module 260 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255, the similarity index module 257, the similarity elements match sets calculation module 259, and the adaptive similarity search module 260 may also be located in the cache 245 or other components. As such, the data duplication module 255, the similarity index module 257, the similarity elements match sets calculation module 259, and the adaptive similarity search module 260 maybe used as needed, based upon the storage architecture and users preferences.

Figure 3:
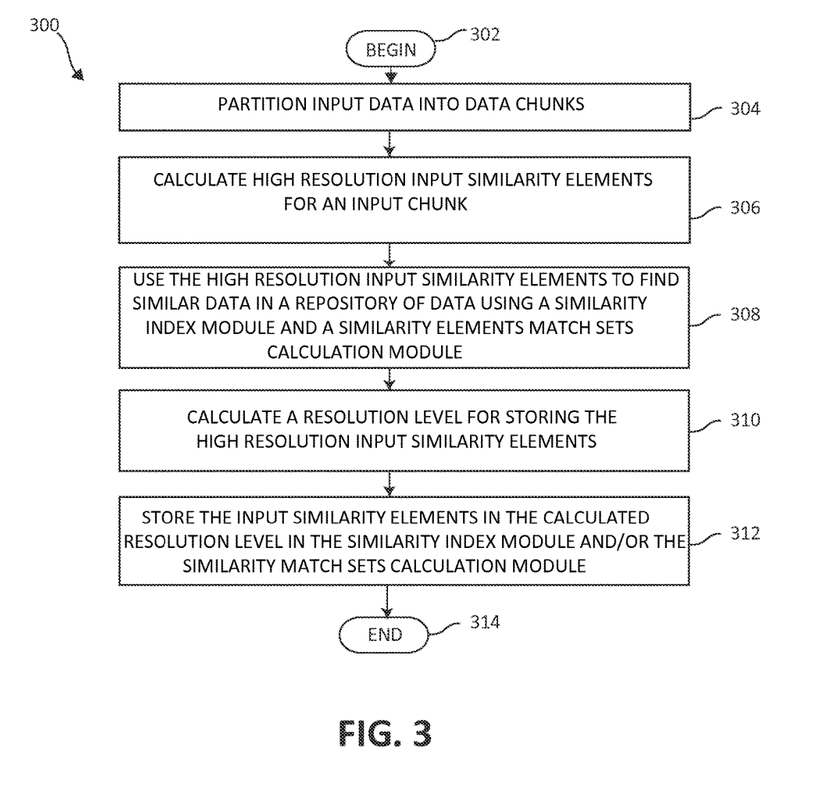
FIG. 3 is a flowchart illustrating an exemplary method for adaptive similarity search resolution in a data deduplication system in which aspects of the present invention may be realized.

FIG. 3 is a flowchart illustrating an exemplary method 300 for adaptive similarity search resolution in a data deduplication system in which aspects of the present invention may be realized. The method 300 begins (step 302). The method 300 partitions input data into data chunks (step 304). The input data may be partitioned into fixed sized data chunks. The method 300 calculates, for each of the data chunks, similarity elements (e.g., high resolution similarity elements) (step 306). The method 300 uses the input similarity elements (e.g., high resolution similarity elements) to find similar data in a repository of data using a similarity search structure (e.g., a similarity index module and a similarity elements match sets calculation module., see FIG. 2 259 and/or 260) (step 308). A resolution level is calculated for storing the input similarity elements (step 310). The method 300 stores the input similarity elements in the calculated resolution level in the similarity search structure (e.g., in the similarity index module and/or the similarity elements match sets calculation module (step 312). The method 300 ends (step 314).

In one embodiment, the present invention provides an algorithm for deduplicating input data by dynamically determining the appropriate similarity resolution. In one embodiment, several levels of similarity resolution are defined. In one embodiment, four levels of resolution are defined, as follows: a single similarity element for chunk sizes of 1 MB, 2 MB, 4 MB and 8 MB.

In one embodiment, the algorithm of the present invention associates with each input stream of data the following variable properties. 1) The current level of resolution for storing similarity elements of the input stream. This property is denoted as the current resolution level property, and is initialized with the value of the highest level of resolution. 2) The average size of the sets of similarity element matches of the input stream. The calculation of this property is specified in the following. 3) The aggregated deduplication ratio of the input stream. The calculation of this property is specified in the following.

In one embodiment, an input stream of data is partitioned into chunks (e.g. of size 8 MB), and the chunks are grouped into chunk sets of a predefined size. Each one of the chunks is processed for deduplication. Determination of a resolution level for storage of the similarity elements calculated for the input chunks, and storage of these similarity elements in accordance with the determined resolution, is done for each chunk set.

Figure 4:
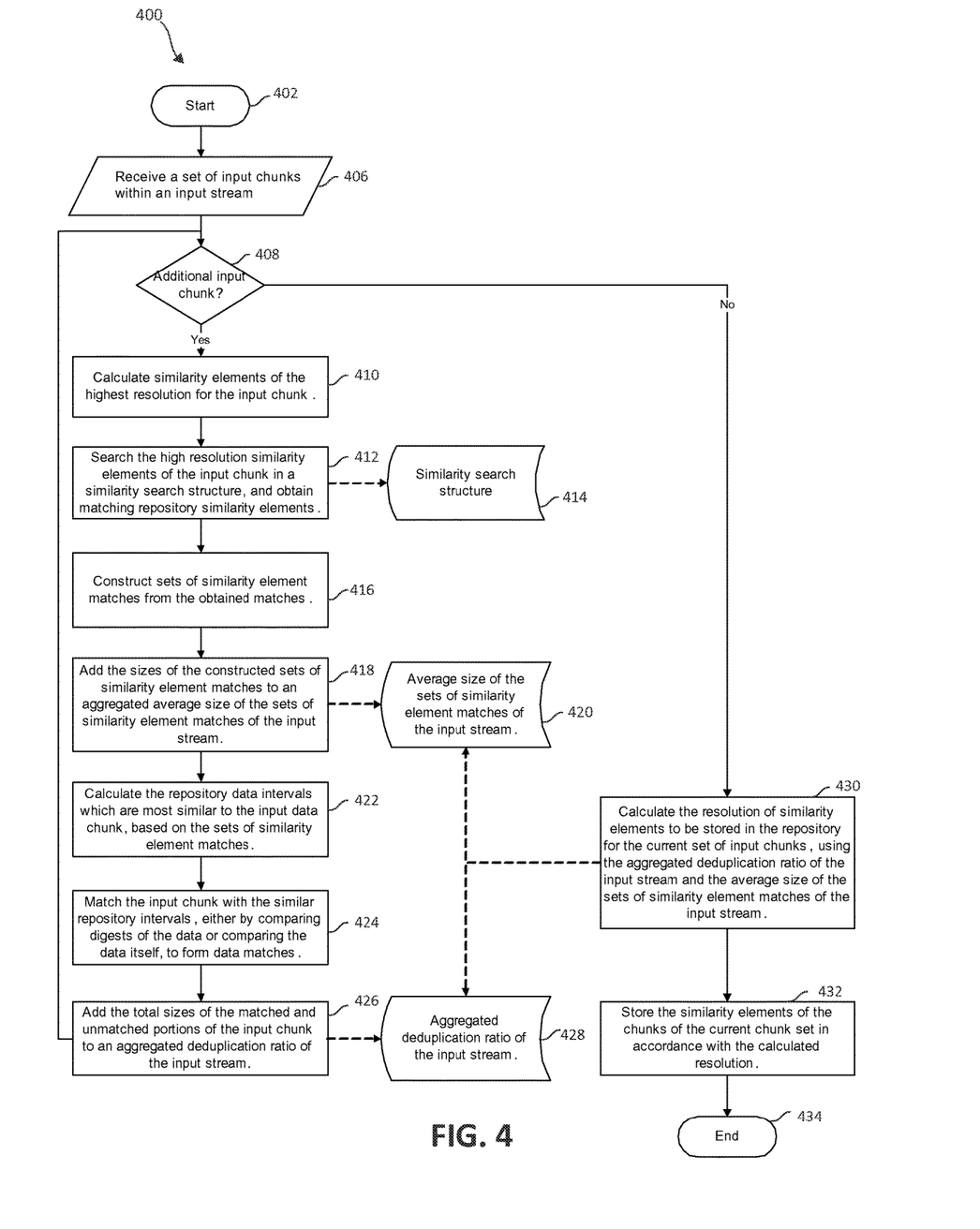
FIG. 4 is a flowchart illustrating an exemplary method for processing a set of input data chunks with adaptive similarity search resolution in which aspects of the present invention may be realized.

FIG. 4 is a flowchart illustrating an exemplary method 400 for processing a set of input chunks with adaptive similarity search resolution in which aspects of the present invention may be realized. The method 400 begins (step 402). The method 400 receives as input a set of input chunks within an input stream of data (step 406). The input chunks are produced by partitioning the input stream of data into chunks (e.g., large fixed size chunks). The method 400 determines if there are additional input chunks (step 408). If no, the method 400 calculates a resolution of similarity elements to be stored in a repository for the current set of input chunks using an aggregated deduplication ratio of an input stream and the average size of sets of similarity elements matches of an input stream (step 430). The method then stores the similarity elements of the input chunks of the current input chunk set in accordance with the calculated resolution (step 432). The method 400 ends (step 434). However, if there are additional input chunks at step 408, the method 400 calculates similarity elements of the highest resolution for the input chunk (step 410). The method 400 searches the highest resolution similarity elements of the input chunk in a similarity search structure (using the similarity search structure of step 414) and obtains matching repository similarity elements (step 412). The method 400 constructs sets of similarity element matches from the obtained matches (step 416). The method 400 adds the sizes of the constructed sets of similarity element matches to an aggregated averages size of the sets of similarity element matches of the input stream (steps 418 and 420). The method 400 calculates the repository data intervals that are most similar to input data chunk, based on the sets of similarity element matches (step 422). The method 400 matches the input chunk with the similar repository intervals, either by comparing digests of the data and/or comparing the data itself, to form data matches (step 424). The method 400 adds total sizes of the matched and unmatched portions of the input chunk to an aggregated deduplication ratio of the input stream (steps 426 and 428). The method 400 then returns to step 408.

In one embodiment, similarity elements of the highest resolution are calculated for an input chunk. It should be noted that there is no additional computational cost in calculating the highest resolution similarity elements, relative to any other resolution. This is because the calculation of the rolling hash values (i.e. a hash value for each small block, e.g. of size 64 bytes, at each byte offset) is required as basis for calculating the similarity elements for any output resolution, and this calculation is typically the major resource consumer. The high resolution similarity elements of the input chunk are searched in a similarity search structure, and matching repository similarity elements are obtained. The similarity element matches that will be formed are upper bound by the resolution of the repository similarity elements that are found as matching.

In one embodiment, sets of similarity element matches are constructed from the obtained matches. A similarity element match is a pair of matching input and repository similarity elements, where each one of the similarity elements has a value and a position in the input and in the repository data respectively. A set of similarity element matches contains similarity element matches of a similar angle. An angle of a similarity element match is defined as the difference between the position in the repository data of the repository similarity element of the pair, and the position in the input data of the input similarity element of the pair. Two angles are defined as similar if their difference does not exceed a predefined threshold. The algorithm for calculating sets of similarity element matches (see FIG. 5 below) inputs a sequence of similarity element matches, and sorts the sequence by the position of the matches in the input data. The algorithm scans the ordered sequence of similarity element matches from first to last, and adds similarity element matches to a current set as long as the angle of the next match is similar to an average angle of the matches already included in the set. If the angle of the next match is not similar to the average angle of the matches in the current set, then the current set is closed, and a new current set is created holding the next match. This process continues until there are no additional similarity element matches to process.

The sizes of the constructed sets of similarity element matches are added to an aggregated average size of the sets of similarity element matches of the input stream (see FIG. 6 below). The repository data intervals, which are most similar to the input data chunk, are calculated based on the sets of similarity element matches. Specifically, each set of similarity element matches serves as basis for determining the boundaries in the input data chunk and in the repository data, of the similar input and repository sub-intervals. The input chunk is matched with the similar repository intervals, either by comparing digests of the data or comparing the data itself, to form data matches. The total sizes of the matched and unmatched portions of the input chunk are added to an aggregated deduplication ratio of the input stream. The deduplication ratio is defined as the total size of the portions of the input data covered by matches with repository data out of the total size of the input data.

When deduplication processing of the input chunks in an input chunk set is complete, the aggregated deduplication ratio of the input stream and the average size of the sets of similarity element matches of the input stream are used to calculate the resolution of similarity elements to be stored in the repository for the chunks in the current chunk set. The high resolution similarity elements of the input chunks in a current chunk set are stored in memory, until a determination of the appropriate resolution for storage of similarity elements is made, and then the appropriate resolution of similarity elements is extracted from the similarity elements in memory and stored in the repository. Lastly, the similarity elements of the chunks in the current chunk set are removed from memory.

In one embodiment, the present invention provides a method for calculating a resolution for storing similarity elements (see FIG. 7 below). In one embodiment, if the aggregated deduplication ratio is sufficiently good, e.g., not lower than a predefined threshold, then there are two cases. If the average size of the sets of similarity element matches is not lower than 2, then the storage resolution of the input stream is decreased by one level. The reason is that a value of 2 or larger implies that there is redundancy in the current resolution level of the similarity elements. The resolution level can be reduced only if it is higher than the lowest resolution level, otherwise it remains as is. Alternatively, if the average size of the sets of similarity element matches is lower than 2, then no change is made in the storage resolution of the input stream. The reason is that a value lower than 2 implies that there is minimal or no redundancy in the current resolution level of the similarity elements, and therefore the current resolution level fits the current input stream. If the aggregated deduplication ratio is not sufficiently good, e.g., lower than a predefined threshold, then the storage resolution of the input stream is increased by one level. The resolution level can be increased only if it is lower than the highest resolution level, otherwise it remains as is.

In one embodiment, the present invention enables similarity based deduplication systems to effectively deduplicate workloads that are difficult for deduplication, e.g., workloads with high reordering rate or high change rate, while keeping resources consumption low. Examples of such workloads are multiplexed backups, virtual machine data sets, and databases backups. Since such workloads are typical in customer environments, this solution resolves a considerable limitation of similarity based deduplication systems and significantly improves their competitiveness.

Figure 5:
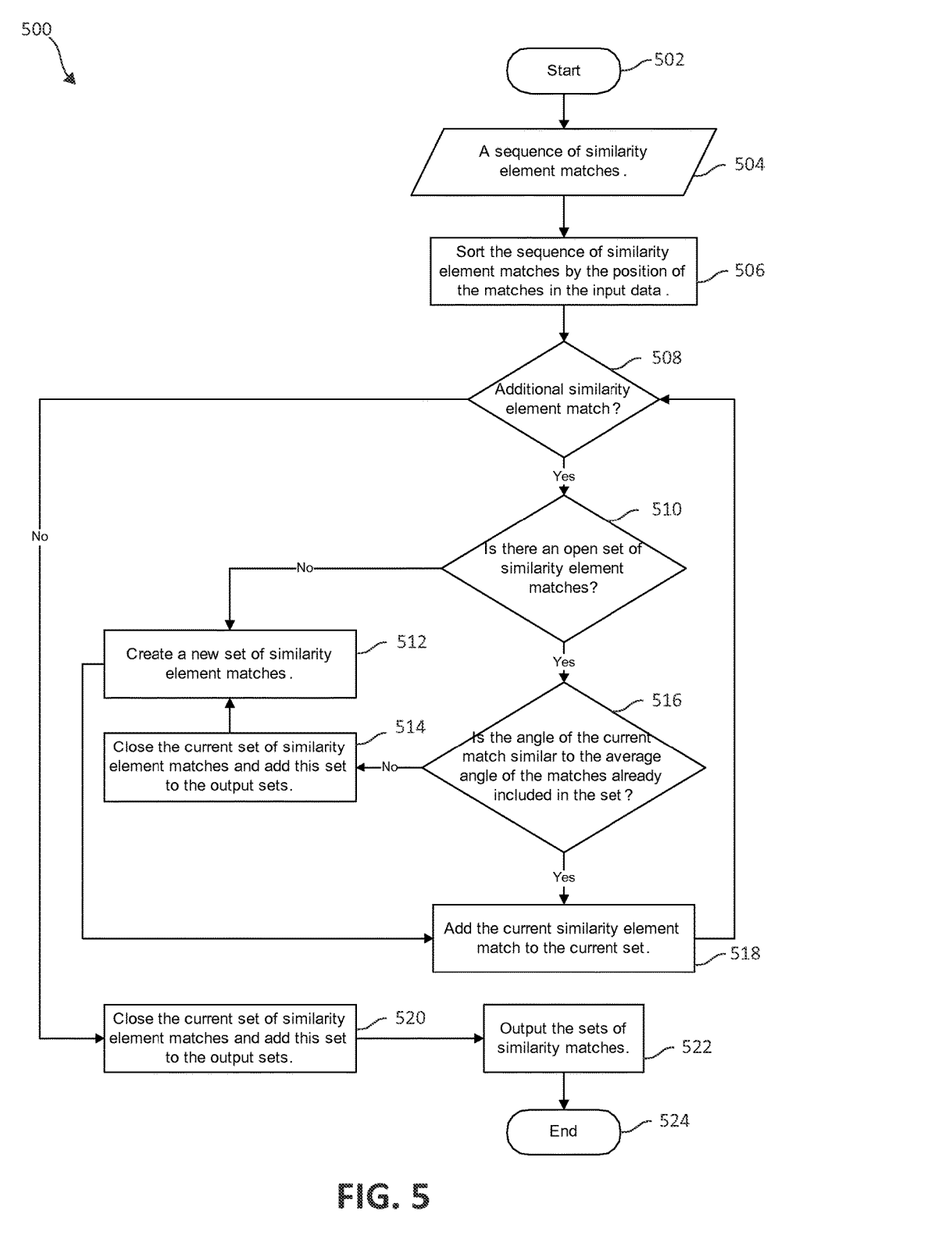
FIG. 5 is a flowchart illustrating an exemplary method for calculating sets of similarity element matches in which aspects of the present invention may be realized.

FIG. 5 is a flowchart illustrating an exemplary method 500 for calculating sets of similarity element matches in which aspects of the present invention may be realized. The method 500 begins (step 502). The method 500 inputs a sequence of similarity element matches (step 504), and sorts the sequence by the position of the matches in the input data (step 506). The method 500 determines if there is an additional similarity element match (step 508). If no, the method 500 closes the current set of similarity element matches and adds this set to the output sets (step 520), and outputs the sets of similarity matches (step 522). The method 500 ends (step 524). If there is an additional similarity element match at step 508, the method 500 determines if there is an open set of similarity element matches (step 510). If no, the method 500 creates a new set of similarity element matches (step 512) and then adds the current similarity element match to the current set of similarity matches (step 518). If yes from step 510, the method 500 determines if the angel of the current match is similar to the average angle of the matches already included the set of similarity element matches (step 516). If no, the method 500 closes the current set of similarity element matches and adds this set to the output sets (step 514), and continues to step 512. If yes from step 516, the method 500 moves to step 518 and adds the current similarity element match to the current set of similarity matches (step 518).

Figure 6:
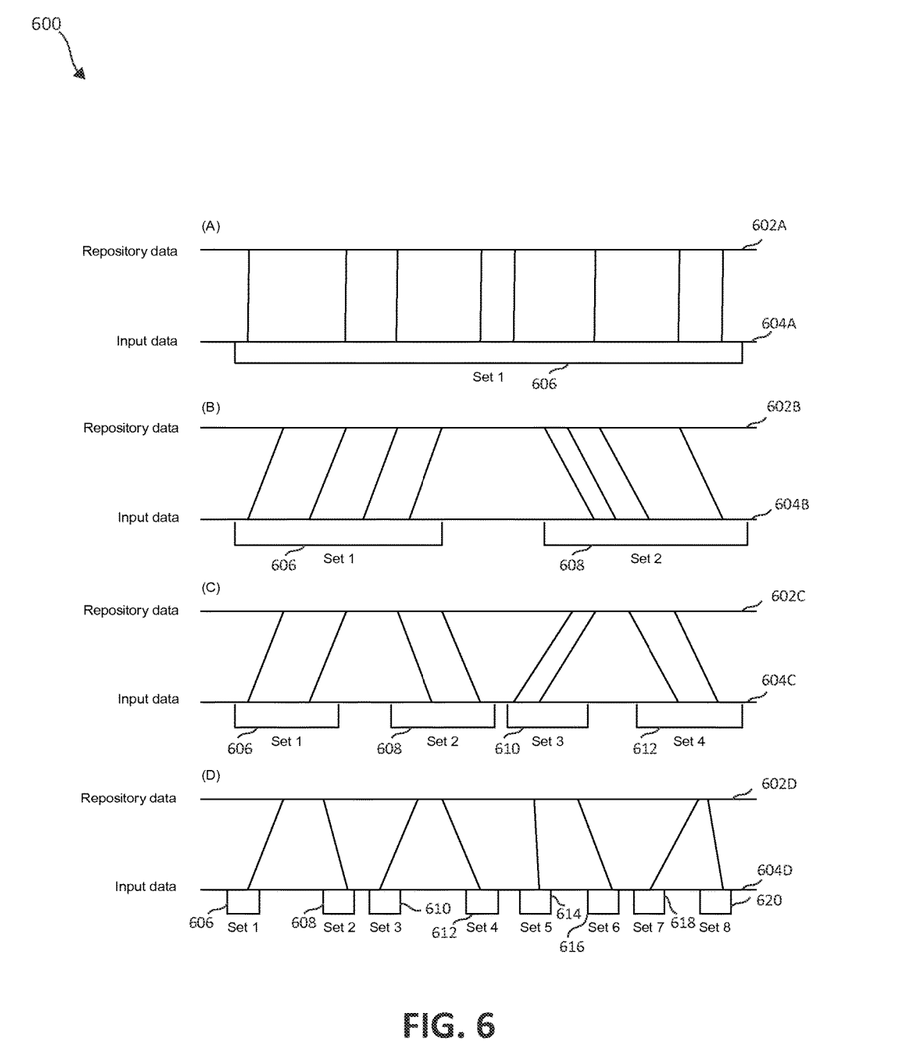
FIG. 6 is a block diagram illustrating exemplary sets of similarity element matches in which aspects of the present invention may be realized.

FIG. 6 is a block diagram illustrating exemplary sets of similarity element matches in which aspects of the present invention may be realized. In one embodiment, the sizes of the constructed sets of similarity element matches are added to an aggregated average size of the sets of similarity element matches of the input stream. FIG. 6 illustrates repository data 602 (shown in FIG. 6 as 602A-D) and input data (shown in FIG. 6 as 604A-D). FIG. 6 exemplifies 4 cases: In case A there is a single set of similarity element matches 606; in case B there are 2 sets 606 and 608; in case C there are 4 sets 606, 608, 610, and 612; and in case D there are 8 sets 606, 608, 610, 612, 614, 616, 618, and 620. The average sizes of the sets 606, 608, 610, 612, 614, 616, 618, and 620 for each case are as follows: in case A-8; in case B-4; in case C-2; and in case D-1.

Figure 7:
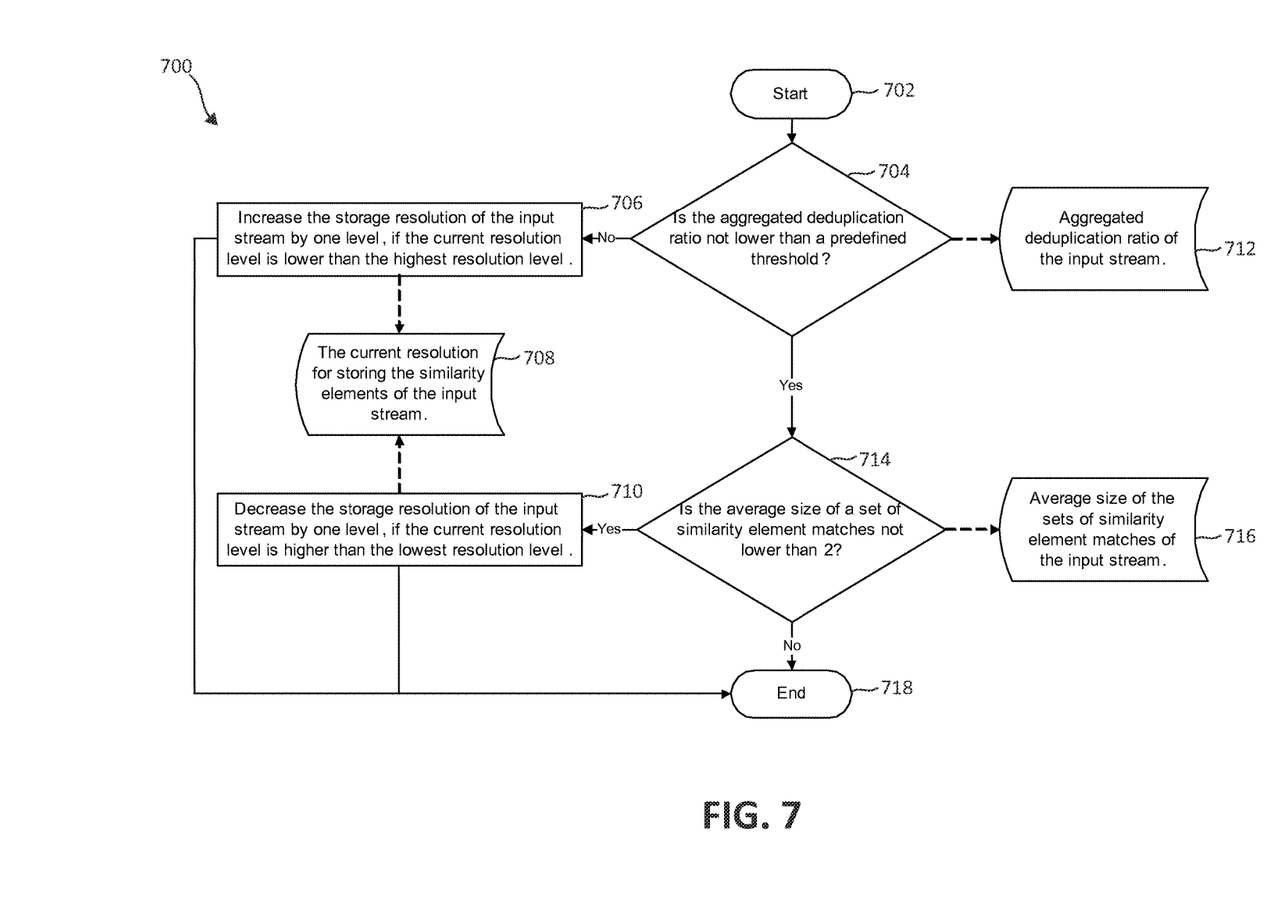
FIG. 7 is a flowchart illustrating an exemplary method for calculating a resolution for storing similarity elements in which aspects of the present invention may be realized.

FIG. 7 is a flowchart illustrating an exemplary method 700 for calculating a resolution for storing similarity elements in which aspects of the present invention may be realized. The method 700 begins (step 702). The method 700 determines if the aggregated deduplication ratio is not lower than a predefined threshold (step 704, using step 712 which is an aggregated deduplication ratio of the input stream). If no, the method 700 increases the storage resolution of the input stream by on level, if the current resolution level is lower than the highest resolution level (step 706, using step 708 which is the current resolution for storing the similarity elements of the input stream). If yes from step 704, the method 700 determines if the average size of a set of similarity element matches is not lower than 2 (step 714 using step 716 which is an average size of the sets of similarity element matches of the input stream). If yes, the method 700 decreases the storage resolution of the input stream by one level, if the current resolution level is higher than the lowest resolution level (step 710 using step 708). If no, the method ends (step 718).

In one embodiment, the present invention provides a method, system, and/or computer program product for calculating an appropriate similarity resolution level for an input workload, based on the average size of the sets of similarity element matches and the aggregated deduplication ratio for adaptive similarity search resolution in a data deduplication system using a processor device in a computing environment. Input data is partitioned into data chunks. High resolution input similarity elements are calculated for each input chunk. The high resolution input similarity elements are used to find similar data in a repository of data using a similarity search structure. A resolution level is calculated for storing the input similarity elements. The input similarity elements are stored in the calculated resolution level in the similarity search structure. In one embodiment, a resolution level is calculated for storing the input similarity elements based on calculated sets of similarity element matches and on a calculated deduplication ratio. The calculated resolution level for storing the input similarity elements is defined to be between a highest resolution level and a lowest resolution level, where each one of the resolution levels is compatible for finding matches with each one of the other resolution levels. An average size of the sets of similarity element matches is calculated, and used to determine the resolution level for storing the input similarity elements. A set of similarity element matches is defined to include similarity element matches with a similar angle, where an angle of a similarity element match is the difference between its position in the repository data and its position in the input data, and where two angles are considered as similar if their difference does not exceed a predefined threshold. An aggregated deduplication ratio is calculated as the total size of the portions of the input chunks covered by data matches out of the total size of the chunks, and the aggregated deduplication ratio is used to determine the resolution level for storing the input similarity elements. The storage resolution level of the similarity elements is decreased if the aggregated deduplication ratio is not lower than a predefined threshold and the average size of the sets of similarity element matches is not lower than two and the current resolution level is higher than the lowest resolution level. The storage resolution level of the similarity elements is increased if the aggregated deduplication ratio is lower than a predefined threshold and the current resolution level is lower than the highest resolution level.

In one embodiment, the present invention provides similarity element resolutions having properties of compatibility and inclusion. In one embodiment, the present invention provides a data deduplication method with adaptive similarity search, including configuring resolution levels for similarity search, calculating input similarity elements in one resolution level for a chunk of input data, using the input similarity elements of the one resolution level to find similar data in a repository of data, where similarity elements of the stored similar repository data are of a plurality of resolution levels.

In one embodiment, the present invention defines the resolution levels to be between a highest resolution level and a lowest resolution level, and configures the similarity elements of each one of the resolution levels to be a subset of the similarity elements of each one of the resolution levels that are higher than the one resolution level.

In one embodiment, the present invention calculates similarity elements based on the maximum values or minimum values of rolling hash values calculated for chunks of input data.

In one embodiment, the present invention calculates a resolution level for the similarity elements of an input chunk based on calculated sets of similarity element matches and on a calculated deduplication ratio.

In one embodiment, the present invention stores the input similarity elements in the calculated resolution level in a similarity search structure, and uses the similarity search structure to find similarity elements of similar repository data.

In one embodiment, the present invention calculates an average size of the sets of similarity element matches, and uses said average size to determine the resolution level of the input similarity elements.

In one embodiment, the present invention calculates an aggregated deduplication ratio as the total size of the portions of the input chunks covered by data matches out of the total size of the chunks, and uses said aggregated deduplication ratio to determine the resolution level of the input similarity elements.

In one embodiment, the present invention decreases the similarity elements resolution level if the aggregated deduplication ratio is not lower than a predefined threshold and the average size of the sets of similarity element matches is not lower than two and the current resolution level is higher than the lowest resolution level; and increases the similarity elements resolution level if the aggregated deduplication ratio is lower than a predefined threshold and the current resolution level is lower than the highest resolution level.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for adaptive similarity search resolution in a data deduplication system using a processor device in a computing environment, comprising:
    partitioning input data into input data chunks, the input data chunks each being at least 4 Megabytes (MB) in size;
    calculating input similarity elements for an input chunk;
    using the input similarity elements to find similar data in a repository of data using a similarity search structure;
    calculating a resolution level for storing the input similarity elements, the resolution level comprising a number of the input similarity elements in relation to a size of the input chunk;
    storing the input similarity elements in the calculated resolution level in the similarity search structure;
    deduplicating the input chunk with the found similar data in the repository of data using the input similarity units in the calculated resolution level;
    calculating the resolution level for storing the input similarity elements based on calculated sets of similarity element matches and on a calculated deduplication ratio, the deduplication ratio defined as a total size of the input data covered by matches with repository data out of the total size of the input data; and
    decreasing the resolution level of the stored input similarity elements if an aggregated deduplication ratio is not lower than a predefined threshold and an average size of the calculated sets of similarity element matches is not lower than two and a current resolution level is higher than a lowest resolution level.

2. The method of claim 1, further including defining the resolution level for storing the input similarity elements to be between a highest resolution level and a lowest resolution level.

3. The method of claim 1, further including performing one of: calculating an average size of the calculated sets of similarity element matches, and using the average size to determine the resolution level for storing the input similarity elements.

4. The method of claim 3, further including defining a set of similarity element matches to include similarity element matches with a similar angle, where an angle of a similarity element match is the difference between a position of the similarity element match in the repository data and a position of the similarity element match in the input data, and where two angles are considered as similar if a difference of the two angles does not exceed a predefined threshold.

5. The method of claim 1 further including performing one of: calculating an aggregated deduplication ratio as a total size of portions of the input data chunks covered by data matches out of a total size of the input data chunks, and using the aggregated deduplication ratio to determine the resolution level for storing the input similarity elements.

6. The method of claim 1, further including increasing a storage resolution level of similarity elements if an aggregated deduplication ratio is lower than a predefined threshold and a current resolution level is lower than a highest resolution level.

7. A system for adaptive similarity search resolution in a data deduplication system of a computing environment, the system comprising:
    the data deduplication system;
    a repository operating in the data deduplication system;
    a memory in the data deduplication system;
    a similarity search structure in association with the memory in the data deduplication system; and
    at least one processor device operable in the computing storage environment for controlling the data deduplication system, wherein the at least one processor device:
        partitions input data into input data chunks, the input data chunks each being at least 4 Megabytes (MB) in size,
        calculates input similarity elements for an input chunk;
        uses the input similarity elements to find similar data in a repository of data using the similarity search structure,
        calculates a resolution level for storing the input similarity elements, the resolution level comprising a number of the input similarity elements in relation to a size of the input chunk, stores the input similarity elements in the calculated resolution level in the similarity search structure, deduplicates the input chunk with the found similar data in the repository of data using the input similarity units in the calculated resolution level;

calculates the resolution level for storing the input similarity elements based on calculated sets of similarity element matches and on a calculated deduplication ratio, the deduplication ratio defined as a total size of the input data covered by matches with repository data out of the total size of the input data; and decreases the resolution level of the stored input similarity elements if an aggregated deduplication ratio is not lower than a predefined threshold and an average size of the calculated sets of similarity element matches is not lower than two and a current resolution level is higher than a lowest resolution level.

8. The system of claim 7, wherein the at least one processor device defines the resolution level for storing the input similarity elements to be between a highest resolution level and a lowest resolution level.

9. The system of claim 7, wherein the at least one processor device performs one of calculating an average size of the calculated sets of similarity element matches, and using the average size to determine the resolution level for storing the input similarity elements.

10. The system of claim 9, wherein the at least one processor device defines a set of similarity element matches to include similarity element matches with a similar angle, where an angle of a similarity element match is the difference between a position of the similarity element match in the repository data and a position of the similarity element match in the input data, and where two angles are considered as similar if a difference of the two angles does not exceed a predefined threshold.

11. The system of claim 7, wherein the at least one processor device performs one of: calculating an aggregated deduplication ratio as a total size of portions of the input data chunks covered by data matches out of a total size of the input data chunks, and using the aggregated deduplication ratio to determine the resolution level for storing the input similarity elements.

12. The system of claim 7, wherein the at least one processor device increases a storage resolution level of similarity elements if an aggregated deduplication ratio is lower than a predefined threshold and a current resolution level is lower than a highest resolution level.

13. A computer program product for adaptive similarity search resolution in a data deduplication system using a processor device in a computing environment, the computer program product comprising a non-transitory computer-readable storage medium having computer-readable program code portions stored therein, the computer-readable program code portions comprising:

an executable portion that partitions input data into input data chunks, the input data chunks each being at least 4 Megabytes (MB) in size;

an executable portion that calculates input similarity elements for an input chunk;

an executable portion that uses the input similarity elements to find similar data in a repository of data using a similarity search structure;

an executable portion that calculates a resolution level for storing the input similarity elements, the resolution level comprising a number of the input similarity elements in relation to a size of the input chunk;

an executable portion that stores the input similarity elements in the calculated resolution level in the similarity search structure;

an executable portion that deduplicates the input chunk with the found similar data in the repository of data using the input similarity units in the calculated resolution level;

an executable portion that calculates the resolution level for storing the input similarity elements based on calculated sets of similarity element matches and on a calculated deduplication ratio, the deduplication ratio defined as a total size of the input data covered by matches with repository data out of the total size of the input data; and an executable portion that decreases the resolution level of the stored input similarity elements if an aggregated deduplication ratio is not lower than a predefined threshold and an average size of the calculated sets of similarity element matches is not lower than two and a current resolution level is higher than a lowest resolution level.

14. The computer program product of claim 13, further including an executable portion that defines the resolution level for storing the input similarity elements to be between a highest resolution level and a lowest resolution level.

15. The computer program product of claim 13, further including an executable portion that performs one of: calculating an average size of the calculated sets of similarity element matches, and using the average size to determine the resolution level for storing the input similarity elements.

16. The computer program product of claim 15, further including an executable portion that defines a set of similarity element matches to include similarity element matches with a similar angle, where an angle of a similarity element match is the difference between a position of the similarity element match in the repository data and a position of the similarity element match in the input data, and where two angles are considered as similar if a difference of the two angles does not exceed a predefined threshold.

17. The computer program product of claim 13, further including an executable portion that performs one of calculating an aggregated deduplication ratio as a total size of portions of the input data chunks covered by data matches out of a total size of the input data chunks, and using the aggregated deduplication ratio to determine the resolution level for storing the input similarity elements.

18. The computer program product of claim 13, further including an executable portion that increases a storage resolution level of similarity elements if an aggregated deduplication ratio is lower than a predefined threshold and a current resolution level is lower than a highest resolution level.

* * * * *